United States Patent [19]

Ono et al.

[11] Patent Number: 4,728,558
[45] Date of Patent: Mar. 1, 1988

[54] MAGNETIC RECORDING MEDIUM

[75] Inventors: Toshio Ono; Yasuo Tamai; Chiaki Mizuno; Hiroshi Ogawa; Shinji Saito, all of Odawara, Japan

[73] Assignee: Fuji Photo Film Co., Ltd., Japan

[21] Appl. No.: 890,342

[22] Filed: Jul. 29, 1986

[30] Foreign Application Priority Data

Aug. 6, 1985 [JP] Japan ................. 60-173757

[51] Int. Cl.$^4$ ................................ G11B 5/70
[52] U.S. Cl. ....................... 428/141; 428/336; 428/694; 428/900
[58] Field of Search .............. 428/694, 141, 900, 480, 428/336; 427/128

[56] References Cited

U.S. PATENT DOCUMENTS 4,202,927  5/1980  Yamaguchi et al. ............. 428/694
4,539,260  9/1985  Abe et al. ....................... 428/900
4,619,855  10/1986  Okita et al. ..................... 428/694

Primary Examiner—Paul J. Thibodeau
Attorney, Agent, or Firm—Gerald J. Ferguson, Jr.; Michael P. Hoffman; Michael J. Foycik, Jr.

[57] ABSTRACT

A magnetic recording medium such as an audio-tape or a video-tape comprising a flexible support and a magnetic recording layer provided on one surface of said support, which is characterized in that the total of the thickness of said magnetic recording layer (dM) and the thickness of said support (dB), namely dM plus dB, is not larger than 14 μm; the ratio of the thickness of said magnetic recording layer (dM) to the thickness of said support (dB), namely dM/dB, is in the range of 0.6–1.0; and said magnetic recording medium has F-3 tensile strength in the range of 6.0–8.5 kg/mm$^2$.

8 Claims, 1 Drawing Figure

MAGNETIC RECORDING MEDIUM

BACKGROUND OF THE INVENTION

1. Field of the Invention

The present invention relates to a magnetic recording medium. More particularly, the invention relates to a magnetic recording medium in the form of tape such as an audio-tape or a video-tape which is improved in running property, distortion (deformation) of shape, etc.

2. Description of Prior Arts

A magnetic recording medium such as an audio cassette tape or a video cassette tape has been conventionally employed or stored in an environment of less temperature variations such as in an interior of house. However, as a radio cassette tape-recorder (i.e., a cassette tape-recorder with radio), a stereo record player for automobiles or a small-sized video tape recorder, etc. are widely employed in recent years, the magnetic recording media are now frequently employed or stored in a severe environment such as an environment of high temperature, environment of high temperature and high humidity, or environment of low temperature. For instance, it is reported that the highest temperature in an automobile interior is 104° C. during day time in the summer season according to the high-temperature or low-temperature exposure test of automobile components.

A magnetic recording medium exposed to such a high temperature is apt to shrink to curl, or to shrink more greatly on the edge of one side than that of the other side to have a bow shape in the longitudinal direction. Otherwise, a hub of a cassette half is likely deformed or ejected out, because the magnetic recording medium shrinks to excessively tighten the hub. Further, when a magnetic recording medium such as an audio-tape recorded with music or a video tape is exposed to high temperature, not only the output level greatly varies in a reproduction process to cause abnormal reproduction, but also the magnetic recording medium shows poor running property. Especially in the case of using a magnetic recording medium having a thin support (e.g., audio compact cassette tapes such as C-80 type, C-90 type and C-120 type), the above-mentioned troubles caused by the shrinkage of tapes markedly take place, because the magnetic tape encased in a cassette half such as an audio cassette or a video cassette is so long that the winding times of tape around the hub increases.

The audio cassette tape is used for recording music in recent years. In this case, a magnetic recording medium is required to show satisfactory frequency characteristics and superb reproducibility of original sounds.

In the case of a video cassette tape, highly dense recording is now possible by shortening recording wavelength or narrowing a track width. A magnetic recording medium is, therefore, required to show excellent electromagnetic conversion characteristics such as high video outputs, high S/N ratio and excellent reproducibility of originally recorded pictures. Further, the recent wide use of portable VTRs request a tape to have an improved running property and durability. While tapes need to be highly durable, the tape thickness tends to be thinner, for example, less than 20 μm, from the viewpoint of recording for a long period of time.

Therefore, both of an audio-tape and a video-tape are strongly required to have much more improved electromagnetic conversion characteristics, running property and durability than the conventional ones.

SUMMARY OF THE INVENION

It is an object of the present invention to provide a magnetic recording medium which shows an excellent running property in the repeated use.

It is another object of the invention to provide a magnetic recording medium which is hardly distorted even after storage thereof at high temperatures.

It is a further object of the invention to provide a magnetic recording medium which is easily brought into close contact with a recording head and a reproducing head.

It is a still further object of the invention to provide a magnetic recording medium in the form of tape such as an audio cassette tape or a video cassette tape which can well reproduce recorded signals without occurrence of tape distortion during the repeated use.

There is provided by the present invenion a magnetic recording medium comprising a flexible support and a magnetic recording layer provided on one surface of said support, which is characterized in that the total of the thickness of said magnetic recording layer (dM) and the thickness of said support (dB), namely dM plus dB, is not larger than 14 μm; the ratio of the thickness of said magnetic recording layer (dM) to the thickness of said support (dB), namely dM/dB, is in the range of 0.6–1.0; and F-3 tensile strength of said medium is in the range of 6.0–8.5 kg/mm².

The magnetic recording medium of the present invention shows an excellent running property in the repeated use, and is hardly distorted even after storage thereof at high temperatures. Further, the magnetic recording medium of the invention is excellent in the easy contact with a recording head or a reproducing head so as to well reproduce the recorded signals. Accordingly, the magnetic recording medium of the invention exhibits excellent properties as a magnetic recording medium in the form of tape such as an audio cassette tape or a video cassette tape.

DETAILED DESCRIPTION OF THE INVENTION

Figure 1:
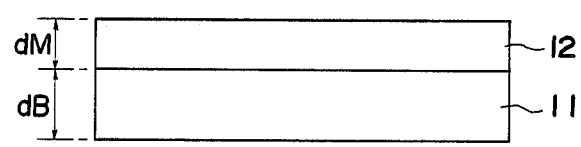
FIG. 1 is a schematic view showing the thickness of the magnetic recording layer (dM) and the thickness of the support (dB) in the magnetic recording medium according to the present invention.

The magnetic recording medium of the invention is a magnetic recording medium comprising a flexible support and a magnetic recording layer provided thereon, which is characterized in that the total of the thickness of said magnetic recording layer (dM) and the thickness of said support (dB), namely dM plus dB, is in the specific range; dM/dB is in the specific range; and the F-3 tensile strength of said medium is in the specific range.

A known method for the preparation of a magnetic recording medium comprises the steps of applying a magnetic paint (i.e., a coating dispersion containing a ferromagnetic powder and a binder) onto a surface of a flexible support, subjecting the coated layer to orientation, and drying the layer to form a magnetic recording layer on the support. The magnetic recording medium of the present invention can be prepared basically in the same manner as in the known method.

A material of the flexible support employable in the invention can be selected from those employed for the preparation of a known magnetic recording medium. Preferred are films of polyester, polycarbonate, polyamide, polysulfone, polypropylene, and polyether sulfone. The flexible support preferably has the heat shrinkage ratio of not higher than 2%, more preferably not higher than 1.5% in the longitudinal direction upon storage at 110° C. for 4 hours. Such a flexible support can be produced by varying the drawing conditions for the preparation of a support. Preferred is a polyester film in which the difference of Young's modulus in the directions is made smaller (the difference is preferably not more than 250 kg/mm$^2$), for example, a polyester film having Young's modulus of 450–650 kg/mm$^2$ in the longitudinal direction and Young's modulus of 400–550 kg/mm$^2$ in the width direction. Also preferred is a polyester film decreased in the heat shrinkage ratio which is obtained by heat-treatment of a drawn polyester film in an atmosphere at a temperature of 110° C. or higher.

The center line average height (Ra), namely a center average roughness, on each surface of the support is preferably in the range of 0.01–0.1 μm. The center line average height (Ra) is a value defined in the Section 5 of JIS-B-0601 at a cut-off value of 0.25 mm. A flexible support having such center line average height can be obtained by utilizing various methods in the preparation of a support. There can be mentioned, for instance, a method of incorporating fine particles into the support (i.e., a method of utilizing pre-formed particles), a method of in situ producing fine particles in the support (i.e., a method of utilizing so called "inner particles"), and a method of controlling the drawing conditions, the draw ratio, the drawing temperature, etc.

On the surface of the support is formed a magnetic recording layer comprising a ferromagnetic powder, a binder and other optional additives. The support may have a back layer (or backing layer) on the opposite side of the side where the magnetic recording layer is to be coated, if necessary.

There is no specific limitation on the ferromagnetic powder employed for the magnetic recording medium of the present invention. Examples of the ferromagnetic powder include γ-iron oxide powder, Co-modified iron oxide powder, iron powder and alloy powder having iron as main component.

The binder employed in the invention is not particularly restricted. Suitably employed are vinyl chloride/vinyl acetate copolymers, vinyl chloride/vinyl acetate/vinyl alcohol copolymers, vinyl chloride/vinyl acetate/maleic acid anhydride copolymers, vinyl chloride/vinyl acetate/acrylic acid copolymers, vinyl chloride/vinylidene chloride copolymers, vinyl chloride/acrylonitrile copolymers, ethylene/vinyl acetate copolymers, nitrocellulose resins, acrylic resins, polyvinyl acetal resin, and polyvinyl butyral resin. A combination of those resins and a polyurethane resin and a combination of those resins and a isocyanate hardening agent are also preferably employed in the present invention.

The magnetic recording medium of the invention may contain in the magnetic recording layer an abrasive (e.g., α-SiC, α-Al$_2$O$_3$, etc.), carbon, etc. in addition to the above-mentioned ferromagnetic powder and binder. The magnetic recording layer of the medium may further contain other various additives such as a dispersing agent and a lubricant. Examples of the additives preferably employed in the invention include fatty acids, fatty acid esters, silicone and alcohols.

The magnetic recording layer of the invention can be formed on the support by the following process. A magnetic paint (coating dispersion for the preparation of a magnetic recording layer) containing the above-described components in a volatile solvent is first coated over the support to give a coated layer. The support with the coated layer is then subjected to a magnetic orienting process prior to drying (hardening) the coated layer, and dried. After the coated layer is dried, the layer is subjected to a surface smoothing process such as supercalendering.

The characteristic requisite of the magnetic recording medium of the present invention, that is, the total of the thickness of the magnetic recording layer (dM) and the thickness of the support (dB) is not larger than 14 μm (namely, dM plus dB ≦ 14 μm); and the ratio of the thickness of the magnetic recording layer to the thickness of the support is in the range of 0.6–1.0 (namely, dM/dB = 0.6–1.0), can be obtained by adjusting both or one of the thickness of the support and the thickness of the magnetic recording layer. Any magnetic recording medium specifically defined in the thickness and the thickness ratio has not been known so far other than the magnetic recording medium of the invention.

The thickness of the magnetic recording layer (dM) and the thickness of the support (dB) in the magnetic recording medium according to the invention are conceptually shown in FIG. 1. In FIG. 1, the magnetic recording medium comprises a support 11 and a magnetic recording layer 12 provided on the support, and each of the thickness of the magnetic recording layer (dM) and the thickness of the support (dB) means a distance between the upper surface and the lower surface of each layer, respectively.

The magnetic recording medium of the present invention further needs to have a tensile strength (F-3 value) in the range of 6.0–8.5 kg/mm$^2$.

The tensile strength F-3 value) is determined as follows. A test tape strip is drawn at a constant rate of 100 mm/min. by a tensile strength tester under tension in the longitudinal direction in an atmosphere of 23° C. and 70% RH to measure the tension load when the test strip is drawn to 103% based on the initial length, and the measured tension load is divided by a sectional area of the test strip. The F-3 value is expressed by kg/mm$^2$, and calculated by the following formula:

$$F - 3 \text{ value} = \frac{\text{Tension load in the case of 103\% drawing of test strip basd on initial length}}{(\text{Width of test strip}) \times (\text{Thickness of test strip})}$$

The magnetic recording medium of the present invention has not been known so far, and such magnetic recording medium satisfying the above-described specific definition exhibits an excellent running property, and is hardly distored even after it is stored at high temperatures. Further, the magnetic recording medium is highly improved in easiness of close contact with a recording head or a reproducing head.

In the present medium, the total thickness (dM plus dB) of the magnetic recording layer and the support is preferably not smaller than 5 μm in practical use. The ratio (dM/dB) of the thickness of the magnetic recording layer to the thickness of the support is preferably in the range of 0.70–0.95.

Further, the present medium preferably has the tensile strength (F-3 value) in the range of 6.3–8.0 kg/mm$^2$ and the heat shrinkage ratio of not higher than 0.8% in the longtitudinal direction after the medium is allowed to stand at 110° C. for 4 hours.

The examples and the comparison examples of the present invention are given below. In the following examples, the expression "part(s)" means "part(s) by weight", unless otherwise specified.

EXAMPLE 1

A magnetic paint (coating dispersion for the preparation of a magnetic recording layer) was prepared by the process comprising the steps of dispersively mixing the components indicated below for 3 hours in a sand grinder of batch type to yield a paste, and filtrating the resultant mixture using a filter having an average pore diameter of 1 μm.

| | |
|---|---|
| $\gamma$-$Fe_2O_3$ (Hc: 400 Oe, average particle length: 0.4 μm, needle ratio: 10/1) | 100 parts |
| Vinyl chloride/vinyl acetate/vinyl alcohol copolymer (copolymerization ratio = 2:3:5, degree of polymerization: 400) | 20 parts |
| Polyester polyurethane (molecular weight: approx. 50,000) | 5 parts |
| Oleic acid | 2 parts |
| Conductive carbon (particle size: 10 mμ) | 1 part |
| Methyl ethyl ketone | 150 parts |
| Cyclohexanone | 50 parts |

The magnetic paint was coated on a polyethylene terephthalate continuous film having thickness of 6 μm (the heat shrinkage ratio is 1.2% in the longitudinal direction upon storing at 110° C. for 4 hours, and a center line average height (Ra) is 0.02 μm at a cut-off value of (0.25 mm). While the coated layer was wet, the layer was treated with an electromagnet of 1,000 gauss to impart a magnetic orientation. After the coated layer was dried, the layer was subjected to supercalendering at 80° C. and 300 kg/cm, to form a magnetic recording layer (thickness: 4.5 μm) having a smooth surface on the film.

The film having the magnetic recording layer was slit into a tape having width of 3.81 mm, and the tape was incorporated into a heat-resistant half. Thus, a Phillips-type compact cassette tape was optained.

In this tape, the total (dB+dM) of the thickness of the support (dB) and the thickness of the magnetic recording layer (dM) was 10.5 μm, and dM/dB was 0.75. The tensile strength (F-3 value) of the tape was 7.3 kg/mm².

The procedure of Example 1 was repeated except that the magnetic paint was coated on a surface of the support in such a manner that the resultant magnetic recording layer would have thickness of 5.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 11.5 μm, and dM/dB was 0.92. The tensile strength (F-3 value) of the tape was 6.5 kg/mm².

COMPARISON EXAMPLE 1

The procedure of Example 1 was repeated except that the magnetic paint was coated on a surface of the support in such a manner that the resultant magnetic recording layer would have thickness of 3.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 9.5 μm, and dM/dB was 0.58. The tensile strength (F-3 value) of the tape was 8.2 kg/mm².

COMPARISON EXAMPLE 2

The procedure of Example 1 was repeated except that the magnetic paint was coated on a surface of the support in such a manner that the resultant magnetic recording layer would have thickness of 6.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 12.5 μm, and dM/dB was 1.08. The tensile strength (F-3 value) of the tape was 5.8 kg/mm².

EVALUATION OF COMPACT CASSETTE TAPE

The compact cassette tapes obtained in the above examples were evaluated on the electromagnetic conversion characteristics, running property, contact characteristics, and occurrence of stain on a magnetic head, and further evaluated on the heat shrinkage ratio, running property and tape distortion after storage at 110° C. for 4 hours. Details of each evaluation are as follows.

(1) Electromagnetic conversion characteristics

M315 (output level at 315 Hz and distortion ratio of 3%) is expressed by a relative value based on the output level of FRI-C-60 (compact cassette tape, available from Fuji Photo Film Co., Ltd.) being 0 dB (measuring device: ZX-9 type produced by Nakamichi Co., Ltd.).

S10K (saturated output level at 10 KHz) is expressed by a relative value based on the output level of FRI-C-60 (compact cassette tape, available from Fuji Photo Film Co., Ltd.) being 0 dB (measuring device: ZX-9 type produced by Nakamichi Co., Ltd.).

(2) Running property

The running test was carried out using 40 commercial audio cassette players to observe the winding condition of each tape and stoppage of tape running. The results of the evaluation are classified into the following.

A: no stoppage of running is observed, and no disorder in winding is found;

B: no stoppage of running is observed, and disorder in winding is found in 1 to 3 players; and C: disorder in winding is found in 4 to 6 players, among which stoppage of running is observed in 1 to 2 players.

(3) Adhesion property

A commercial adhesive tape was placed on the surface of the magnetic recording layer of each cassette tape. Under fixing one end of the cassette tape, one end of the adhesive tape was drawn in the direction of 180°, to measure the tension load at which the magnetic recording layer peeled off from the support. The results of the evaluation are classified into the following.

A: tension load of not less than 41 g.;

B: tension load of 21 g.-40g.; and

C: tension load of not more than 21 g.

(4) Stain on the magnetic head

After the above-described running test, the stain on the magnetic head of the cassette deck was observed.

The results of the evaluation are classified into the following.

A: no stain is noted;
B: some stain causing no practical trouble is noted; and
C: much stain is noted.

(5) Heat shrinkage ratio

The compact cassette tape was beforehand marked at intervals of approx. 10 cm in an atomsphere of 23° C. and 60% RH, and each interval (L) between the marks was measured using a micrometer. Then, the tape was allowed to stand at 110° C. for 4 hours with a pending weight of 0.4 g. per 10 mm width, and the tape was further allowed to stand in the same atmosphere for 1 hour without weight, to measure the interval (L') between the marks. The measured values are incorporated into the following formula to obtain the heat shrinkage ratio.

Heat shrinkage ratio = $[(L-L')/L] \times 100(\%)$ (6) Tape distortion

The compact cassette tape was subjected to repeated running of 100 times using a commercial audio cassette deck, to evaluate the tape distortion through eye observation. The results of the evaluation are classified into the following.

A: no distortion is found;
B: tape edge is stretched to a certain extent; and
C: tape edge is excessively stretched to give a frilled tape.

The results of the evaluations are set forth in Table 1.

TABLE 1

|  | Example | | Com. Example | |
| --- | --- | --- | --- | --- |
|  | 1 | 2 | 1 | 2 |
| M315 (dB) | −0.1 | 0.6 | −0.7 | 0.8 |
| S10K (dB) | 1.3 | 1.2 | 1.9 | 0.7 |
| Running property | A | A | A | B |
| Adhesive strength | A | A | A | A |
| Stain on head | A | A | A | A |
| After storage at 110° C. for 4 hours |  |  |  |  |
| Heat shrinkage ratio (%) | 0.40 | 0.34 | 0.48 | 0.31 |
| Running property | A | A | B | B |
| Tape distortion | A | A | C | C |

EXAMPLE 3

The procedure of Example 1 was repeated except that a polyethylene terephthalate continuous film having thickness of 7 μm (the heat shrinkage ratio is 1.2% in the longitudinal direction upon storing at 110° C. for 4 hours, and center line average height (Ra) is 0.02 μm) was used as support, and that the magnetic pain was coated on the support in such a manner that the resultant magnetic recording layer would have thickness of 5.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 12.5 μm, and dM/dB was 0.79. The tensile strength (F-3 value) of the tape was 8.0 kg/mm².

EXAMPLE 4

The procedure of Example 3 was repeated except that the magnetic paint was coated on a surface of the support in such a manner that the resultant magnetic recording layer would have thickness of 6.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 13.5 μm, and dM/dB was 0.93. The tensile strength (F-3 value) of the tape was 7.5 kg/mm².

COMPARISON EXAMPLE 3

The procedure of Example 3 was repeated except that the magnetic paint was coated on a surface of the support in such a manner that the resultant magnetic recording layer would have thickness of 4.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) was 11.5 μm, and dM/dB was 0.64. The tensile strength (F-3 value) of the tape was 8.7 kg/mm².

COMPARISON EXAMPLE 4

The procedure of Example 3 was repeated except that the magnetic paint was coated on a surface of the support in such a manner that the resultant magnetic recording layer would have thickness of 7.5 μm, to obtain a film having a magnetic recording layer. The film was slit into a tape, which was then incorporated into a heat-resistant half, to obtain a Phillips-type compact cassette tape in the same manner as described in Example 1.

In this tape, the total (dB+dM) of the thickness of the support (dB) and the thickness of the magnetic recording layer (dM) and was 14.5 μm, and dM/dB was 1.07. The tensile strength (F-3 value) of the tape was 6.9 kg/mm².

EVALUATION OF COMPACT CASSETTE TAPE

The compact cassette tapes obtained in the above examples were evaluated on the electromagnetic conversion characteristic, running property, contact characteristics and occurrence of stain on the magnetic head, and further evaluated on the heat shrinkage ratio, running property and tape distortion after storage at 110° C. for 4 hours. Details of each evaluation are as described hereinbefore.

The results of the evaluations are set forth in Table 2.

TABLE 2

|  | Example | | Com. Example | |
| --- | --- | --- | --- | --- |
|  | 3 | 4 | 3 | 4 |
| M315 (dB) | 0.5 | 0.7 | −0.2 | 0.8 |
| S10K (dB) | 1.0 | 0.6 | 1.2 | 0.5 |
| Running property | A | A | A | A |
| Adhesive strength | A | A | A | C |
| Stain on head | A | A | A | C |
| After storage at 110° C. for 4 hours |  |  |  |  |

TABLE 2-continued

|  | Example | | Com. Example | |
| --- | --- | --- | --- | --- |
|  | 3 | 4 | 3 | 4 |
| Heat shrinkage ratio (%) | 0.40 | 0.35 | 0.50 | 0.31 |
| Running property | A | A | B | A |
| Tape distortion | A | A | C | B |

We claim:

1. A magnetic recording medium comprising a flexible support and a magnetic recording layer provided on one surface of said support, said magnetic recording layer comprising a ferromagnetic powder and a binder, which is characterized in that the total of the thickness of said magnetic recording layer and the thickness of said support is not larger than 14 μm; the ratio of the thickness of said magnetic recording layer to the thickness of said support is in the range of 0.6–1.0; and said magnetic recording medium has F-3 tensile strength in the range of 6.0–8.5 kg/mm$^2$.

2. The magnetic recording medium as claimed in claim 1, wherein the total of the thickness of said magnetic recording layer and the thickness of said support is not smaller than 5 μm.

3. The magnetic recording medium as claimed in claim 1, wherein the ratio of the thickness of said magnetic recording layer to the thickness of said support is in the range of 0.70–0.95.

4. The magnetic recording medium as claimed in claim 1, wherein the F-3 tensile strength of the magnetic recording medium is in the range of 6.3–8.0 kg/mm$^2$.

5. The magnetic recording medium as claimed in claim 1, wherein said flexible support has a center line average height in the range of 0.01–0.1 μm on the surface where the magnetic recording layer is provided.

6. The magnetic recording medium as claimed in claim 1, wherein said magnetic recording medium has heat shrinkage ratio of not higher than 0.8% in the longitudinal direction after said medium is allowed to stand at 110° C. for 4 hours.

7. The magnetic recording medium as claimed in any claim of claims 1 to 6, wherein said magnetic recording medium is an audio cassette tape.

8. The magnetic recording medium as claimed in any claim of claims 1 to 6, wherein said magnetic recording medium is a video cassette tape.

* * * * *